…

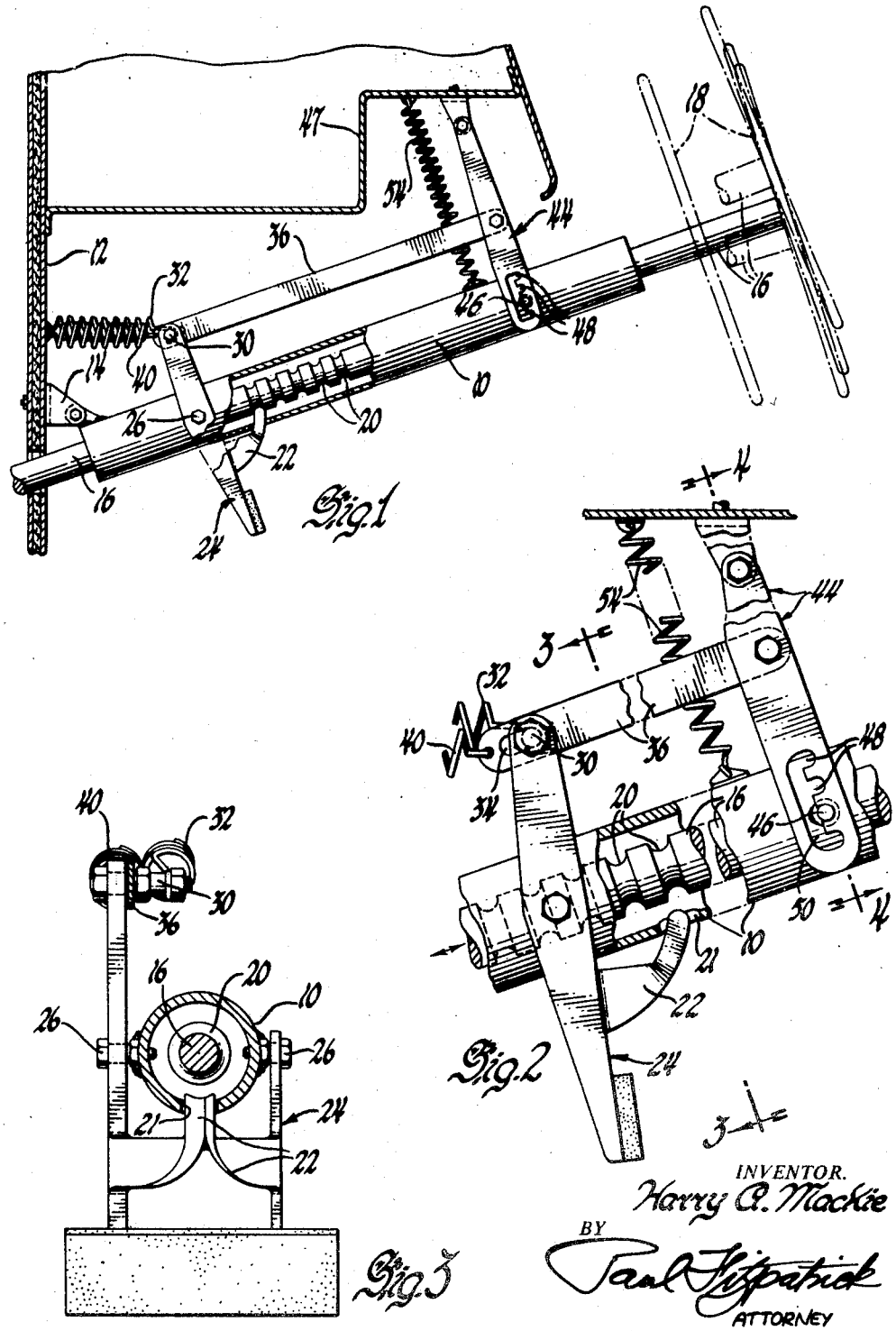

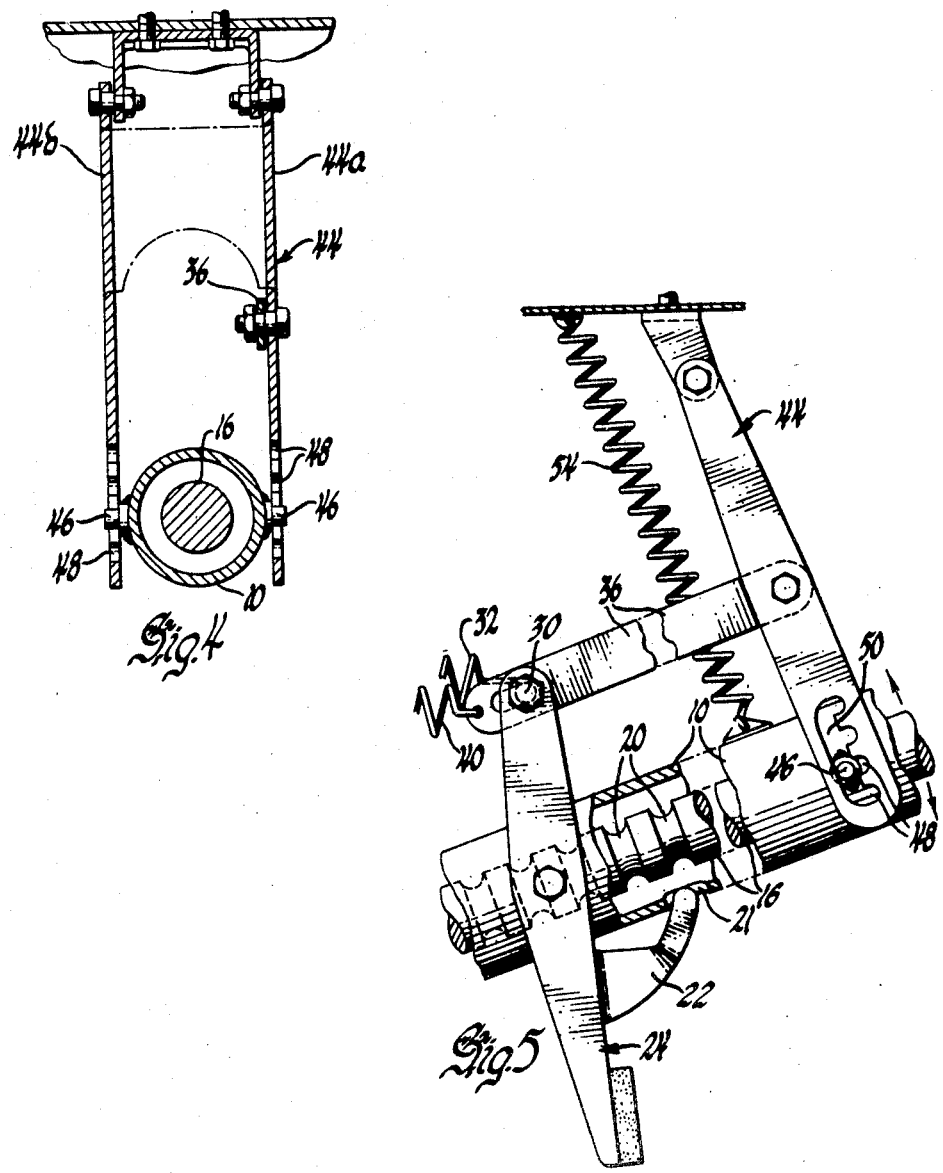

United States Patent Office 2,903,904
Patented Sept. 15, 1959

2,903,904

ADJUSTABLE STEERING COLUMN AND SHAFT

Harry A. Mackle, Birmingham, Mich., assignor to General Motors Corporation, Detroit, Mich., a corporation of Delaware Application March 19, 1958, Serial No. 722,585

5 Claims. (Cl. 74—493)

This invention concerns self-propelled vehicles incorporating a steering column and shaft and, more especially, relates to means enabling adjustment of such column and shaft to suit the comfort and convenience of the operator of the vehicle.

As well known, the variation among individual vehicle operators in point of height, girth and porportioning is substantial, indeed, and has always presented a serious problem to automotive engineers and designers charged with setting the rake or angularity of the steering column and the longitudinal position of the steering wheel.

Although considerable effort has been expended toward developing a suitable mechanism allowing adjustment of the rake of the steering column and shaft and lengthening or foreshortening of the latter, such mechanisms as presently devised are either too costly to be practicable or fail to meet safety standards. Additionally, many of the prior mechanisms are inconvenient to operate, requiring the use of hand tools to manipulate parts accessible only by raising the engine hood or bonnet.

A principal object of the invention is to provide such a mechanism which may be operated by the driver while seated behind the steering wheel, or equivalent instrumentality.

Another object is to provide a mechanism of a design such that the force required to effect unlocking thereof, thereby to enable a desired adjustment, is applied through the operator's foot.

Yet another object is to provide a system of apparatus for the purpose indicated wherein the locking devices corresponding to the two adjustments are controlled through a single foot pedal.

A further object is to provide a mechanism incorporating "feel" means enabling the operator to differentiate between the pedal positions corresponding to the two adjustments.

A preferred embodiment of the invention is illustrated by the accompanying drawings wherein:

Figure 1 is a view showing the principal parts in side elevation;

Figure 2 is an enlarged fragmentary view which, taken with Figure 1, illustrates the operation of the parts concerned with the axial adjustment of the steering shaft;

Figure 3 is a section on the line 3—3 in Figure 2;

Figure 4 is a section on the line 4—4 in Figure 2; and

Figure 5 taken with Figure 2 illustrates the operation of the parts concerned with the rake adjustment.

In the drawings, the numeral 10 denotes the steering column which will be seen as pivotally connected to the fire wall 12 at 14. Carried within the column 10 and turning in bearings, not shown, housed within such column is a steering shaft 16 mounting the usual steering wheel 18 at its upper end. Shaft 16 may be considered as splined at its lower end to enable sliding connection with a worm, not shown, through which the rotary motion of the steering shaft is translated into steering action.

Shaft 16 will be noted as having a plurality of annular grooves 20 adapted to receive a detent 22 fixed to, or integral with, a foot pedal 24 and extending through a slot 21 in column 10 (Figure 2). Such pedal is pivoted on the steering column 10 at 26 (Figures 1 and 4) and carries a stud or pin 30 providing anchorage for a spring 32. At its opposite end the spring 32 is connected, as shown in Figure 1, to the fire wall 12.

Stud 30 is accommodated in a slot 34 formed in a linkage member 36. A spring 40, again as shown in Figure 1, connects the link 36 to the fire wall 12. This link extends to a support or latch member 44 spaced rearwardly and upwardly of the pedal. Such member has pivotal connection with the dash panel 47 and comprises legs 44a and 44b (Figure 4) enabling it to straddle the column 10. The latter has fixed thereto, as by welding, a pair of pins 46 adapted to be accommodated in notches 48 in the legs 44a and 44b. Slots 50 enable shifting of the pins 46 between the notches 48, as later explained.

With the arrangement as shown and described, it should be clear that the spring 32 biases the pedal 24 in a direction tending to maintain the detent 22 in the selected annular recess 20. Similarly, it should be clear that the spring 40 exerts a force on link 36 tending to bring about clockwise rotation of the latch member 44 and that this condition assures proper seating of pins 46 in the selected notches 48. A third spring 54, not hereinbefore mentioned, operates to counterbalance the weight of column 10.

Let it be assumed now that the vehicle operator, after he has seated himself in the vehicle, finds the rake of the steering column satisfactory but desires more space between himself and the steering wheel. In this circumstance, has has only to depress the pedal 24 against the resistance of the spring 32 to the point where he begins to sense the additional resistance of spring 40. At such point he pushes the steering wheel and with it, of course, the steering shaft, downwardly to the position desired. Thereafter he releases the pedal, with the result that detent 22 is snapped by action of the spring 32 into the annular groove 20 corresponding to the new steering wheel position. As should be apparent, the described movement of the pedal 24 independently of link 36 is permitted by the lost motion connection provided by the slot 34 in the link.

Should an operator of the vehicle find the rake of the column 10 not to his liking, he depresses the pedal 24 to an extent causing link 36 to rotate latch 44 counterclockwise sufficiently to enable shifting of pins 46 to the lower notches 48 or to one of the higher notches 48, depending on the rake change desired. Any undesired axial displacement of the steering shaft 16 occurring incident to the rake correction is, of course, easily taken care of before full release of the pedal 24.

The invention being thus described and illustrated, what is claimed is:

1. In a self-propelled vehicle, a steering column mounted for up and down swinging movement about an axis disposed transversely of the vehicle, means for locking said column in a plurality of angular positions relative to the horizontal, a steering shaft axially movable within said column, means for locking said shaft in a plurality of axial positions, and operator-manipulated trip means whereby, with said column and shaft locked in selected positions, said lock means may be disengaged to allow for changing of the position of one or both of said column and shaft, said trip means including a first part functional with respect to said first-mentioned lock means and a second part functional with respect to said second-mentioned lock means, said parts having a lost motion connection so that one of said parts may be actuated without actuation of the other.

2. In a self-propelled vehicle, a steering column mounted for up and down swinging movement about an axis disposed transversely of the vehicle, means for yieldably locking said column in a plurality of angular positions relative to the horizontal, a steering shaft axially movable within said column, said shaft carrying a steering wheel or the like at the upper end thereof, means for yieldably locking said shaft in a plurality of axial positions, and foot-operated trip means whereby, with said column and shaft locked in selected positions, said lock means may be disengaged to allow for changing of the position of one or both of said column and shaft by manual effort applied at said steering wheel or the like, said trip means including a first part functional with respect to said first-mentioned lock means and a second part functional with respect to said second-mentioned lock means, said parts having a lost motion connection so that said second part may be actuated without actuation of the other part.

3. In a self-propelled vehicle, a steering column mounted for up and down swinging movement about an axis disposed transversely of the vehicle, means for locking said column in a plurality of angular positions relative to the horizontal, a steering shaft axially movable within said column, means for locking said shaft in a plurality of axial positions, and operator-manipulated trip means whereby, with said column and shaft locked in selected positions, said lock means may be disengaged to allow for changing of the position of one or both of said column and shaft, said trip means including a first part functional with respect to said first-mentioned lock means and a second part functional with respect to said second-mentioned lock means having a lost motion connection with said first part enabling actuation thereof without actuation of said first part, each of said parts having spring means associated therewith urging it toward a position corresponding to the locked position of the corresponding lock means, the resistance of the spring means associated with said first-mentioned lock means being insensible to the operator until said connection is taken up.

4. In a self-propelled vehicle, a steering column mounted for up and down swinging movement about an axis disposed transversely of the vehicle, means for locking said column in a plurality of angular positions relative to the horizontal, said means comprising latch means pivoted to a fixed portion of the vehicle and adapted to engage pin means carried by said column, a steering shaft axially movable within said column and having a plurality of annular grooves formed in the body thereof within said column, foot-operated lever means pivoted to said column and carrying detent means adapted to seat in any of said grooves to lock said column in a corresponding axial position, linkage means between said latch means and said lever means and having a lost motion connection with the latter, said lost motion connection enabling displacement of said detent means without displacement of said latch means, and separate spring means urging said linkage means and said lever in directions corresponding to the locked positions of said latch means and said detent means.

5. Apparatus conforming with claim 4, which further comprises spring means anchored to a fixed portion of the vehicle and to said column to counterbalance the latter.

References Cited in the file of this patent

UNITED STATES PATENTS

| | | |
|---|---|---|
| 804,375 | Buffum | Nov. 14, 1905 |
| 805,944 | Clark | Nov. 28, 1905 |
| 1,367,695 | Gray | Feb. 8, 1921 |
| 1,608,382 | Fox | Nov. 23, 1926 |
| 1,951,858 | Bracke | Mar. 20, 1934 |
| 2,140,319 | Heppner et al. | Dec. 13, 1938 |
| 2,383,440 | Baxter | Aug. 28, 1945 |
| 2,464,856 | Finley | Mar. 22, 1949 |

FOREIGN PATENTS

| | | |
|---|---|---|
| 433,988 | Great Britain | Aug. 23, 1935 |